United States Patent [19]

Eklund

[11] 4,194,175
[45] Mar. 18, 1980

[54] AUTOMOBILE HEADLIGHT ALARM SYSTEM

[76] Inventor: Walter A. Eklund, 6036 Portland Ave. S., Minneapolis, Minn. 55417

[21] Appl. No.: 944,716

[22] Filed: Sep. 22, 1978

[51] Int. Cl.² ............................................. B60Q 5/00
[52] U.S. Cl. .................. 340/52 D; 315/82; 361/196
[58] Field of Search ............... 340/52 D; 315/82, 84, 315/77; 317/141 R, 141 S; 361/196

[56] References Cited

U.S. PATENT DOCUMENTS

| | | | |
|---|---|---|---|
| 3,476,975 | 11/1969 | Brock | 340/52 D |
| 3,581,276 | 5/1971 | Newman | 340/52 D |
| 3,810,089 | 5/1974 | Florence et al. | 340/52 D |

Primary Examiner—Alvin H. Waring
Attorney, Agent, or Firm—Kinney, Lange, Braddock, Westman and Fairbairn

[57] ABSTRACT

A warning apparatus to indicate to a driver that the headlights of the vehicle have been left on after the ignition has been turned off includes a timer circuit which is operably connected to the ignition switch, the headlight switch, and the horn of the vehicle. The timer circuit energizes the horn for a predetermined period after the ignition switch is turned off while the headlight switch remains on.

6 Claims, 2 Drawing Figures

AUTOMOBILE HEADLIGHT ALARM SYSTEM

BACKGROUND OF THE INVENTION

The present invention relates to a warning or indicator apparatus for motor vehicles. In particular, the present invention relates to a warning apparatus which indicates to the driver when lights of the vehicle have been left on and the ignition to the vehicle has been turned off.

Over the years, a wide variety of indicators and warning devices have been developed for automobiles and other motor vehicles. These indicator warning devices have alerted the driver to a wide variety of different dangerous or undesirable conditions of the automobile.

One of the most frustrating, and in some cases dangerous, conditions which can occur in the use of a motor vehicle occurs when the operator turns off the ignition but leaves the headlights on. Since most if not all vehicles permit the lights to be operated independently of the ignition, it is possible to run down the energy stored in the battery to a point where the battery is insufficient to start the automobile.

In the past, several types of warning or indicator devices have been developed to alert the operator to the fact that the lights are left on after the ignition switch has been turned off. U.S. Pat. Nos. 2,283,299 by Savino and 3,755,775 by Ward are examples of two such devices.

Despite the previous activities in attempting to solve this problem, there is a continuing need for improved headlight warning devices. One problem with the prior art devices is that the alarm continues as long as the lights remain on. This can be very annoying if for some reason the driver wishes to leave the lights on with the ignition off; for example, if he is performing repairs at night with the engine off.

SUMMARY OF THE INVENTION

The warning apparatus of the present invention includes timer means which is operatively connected to the ignition switch, the headlight switch, and the horn of the motor vehicle in which it is installed. When the ignition switch is turned off with the headlight switch still on, the timer means energizes the vehicle's horn for a predetermined period, and then turns off even if the lights have not been turned off. The predetermined period is long enough to warn or notify the driver, and if the driver does not turn the lights off by the end of the period, he must desire to keep the lights on for some purpose.

DETAILED DESCRIPTION OF THE PREFERRED EMBODIMENTS

Figure 1:
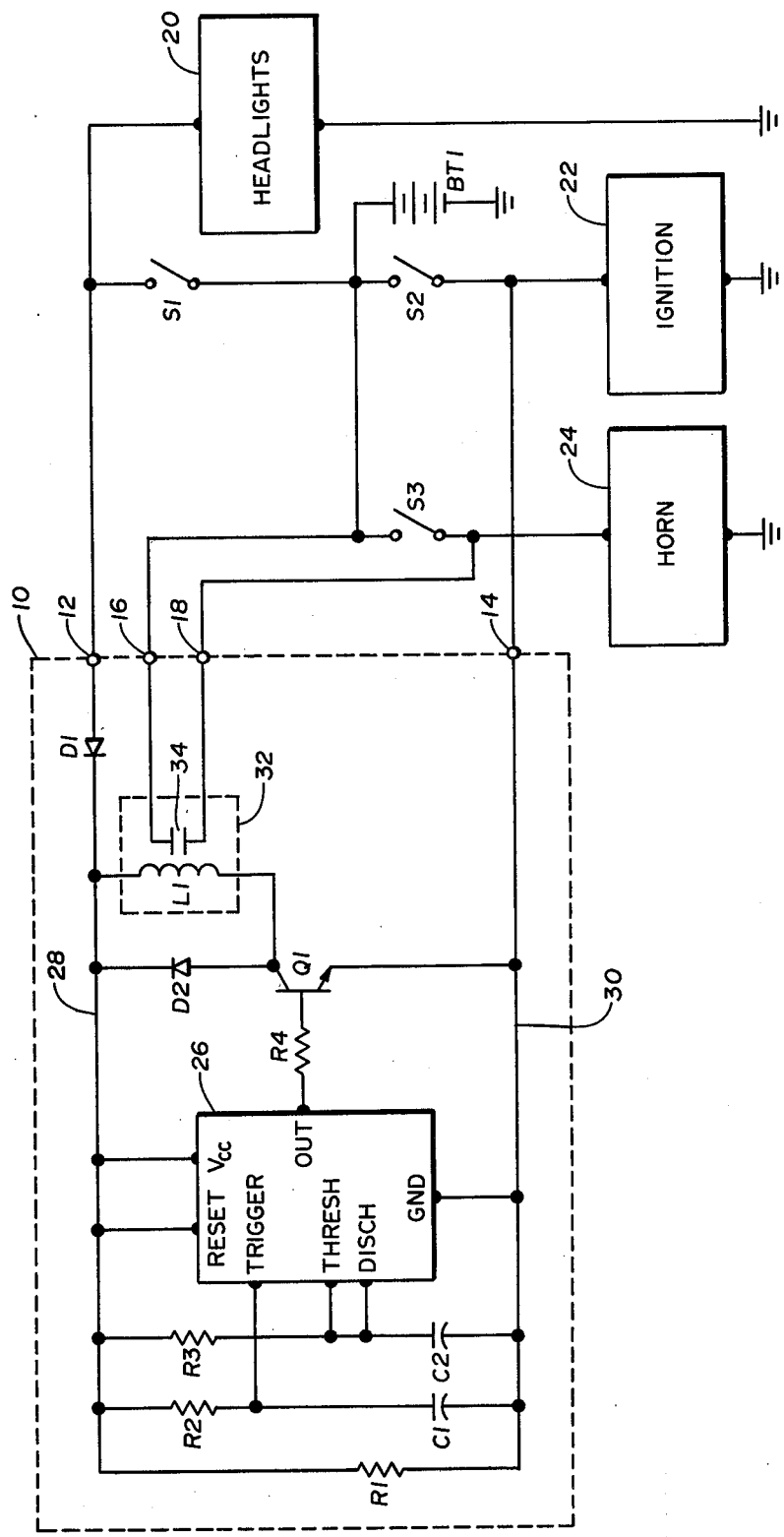
FIG. 1 is a schematic diagram of one preferred embodiment of the headlight warning apparatus of the present invention.

The Warning Apparatus of FIG. 1

The headlight warning apparatus of the present invention is shown in one preferred form in FIG. 1. In this embodiment, the warning apparatus is added to an existing automobile in the form of a circuit in a housing 10 with four terminals, 12, 14, 16 and 18.

The automobile includes a conventional storage battery BT1, which supplies power for headlights 20, ignition 22 and horn 24. Headlights 20, ignition 22 and horn 24 are controlled by headlight switch S1, ignition switch S2, and horn switch S3, respectively.

As shown in FIG. 1, the circuit 10 includes a solid state timer 26, which is preferably NE 555 V monolithic timing circuit manufactured by National Semiconductor. Power to the circuit is supplied at terminals 12 and 14, which derive signals from the headlight switch S1 and ignition switch S2, respectively.

The circuit has two main conductors 28 and 30. Diode D1 has its anode connected to terminal 12, and its cathode connected to first conductor 28. Second conductor 30 is connected directly to terminal 14.

Timer 26 has its Reset and $V_{cc}$ terminals connected to main connector 28, and its Ground terminal connected to conductor 30. Resistor R1 is connected between conductors 28 and 30. An RC network formed by resistor R2 and capacitor C1, and an RC network formed by resistor R3 and capacitor C2 are connected between conductors 28 and 30. The Trigger input to timer 26 is derived from the junction of resistor R2 and capacitor C1. The Threshold and Discharge terminals of timer 28 are connected to the junction of resistor R3 and capacitor C2.

The output of timer 26 is supplied through resistor R4 to the base of NPN transistor Q1. The emitter of Q1 is connected to conductor 30 and the collector is connected through coil L1 of relay 32 to conductor 28. Connected in parallel with coil L1 is diode D2. The normally open relay contacts 34 are connected to terminals 16 and 18, which in turn are connected to opposite sides of horn switch S3.

In operation, the system of FIG. 1 energizes horn 24 whenever ignition switch S2 is turned to an OFF position while headlight switch S1 remains ON. Horn 24 is energized for a predetermined time period and then is turned off. If, of course, headlight switch S1 is turned OFF before the predetermined time period expires, horn 24 is turned off at that time.

If both switches S1 and S2 are OFF, or if switch S2 is ON but switch S1 is OFF, circuit 10 is disabled and contacts 34 remain open. When both switches S1 and S2 are ON and switch S2 is then turned OFF, a negative voltage pulse is induced at the trigger input of timer 26, due to the decrease in voltage at terminal 14, since terminal 14 is no longer directly connected to the positive terminal of battery BT1. Since switch S1 is still ON, a positive voltage is being supplied through terminal 12, through diode D1, to conductor 28 and to the Reset and $V_{cc}$ terminals of timer 26. The application of the negative trigger pulse to the trigger input releases a short circuit which existed across capacitor C2 and drives the output of timer 26 high. The voltage across C2 rises exponentially as a function of the time constant R3 C2. When the voltage across capacitor C2 equals $\frac{2}{3} V_{cc}$, timer 26 discharges capacitor C2 rapidly and drives the output to a low state.

While the output of timer 26 is high, transistor Q1 is turned on, which energizes relay coil L1 and closes contacts 34. Since contacts 34 are in parallel with switch S3, the closure of these contacts energizes horn 24 for the time period that the output of timer 26 remains high, which is determined by the time constant R3.C2.

It is only under the condition of switches S1 and S2 both being ON and then switch S2 being turned OFF that the operation of the timing circuit 10 is commenced. When both S1 and S2 are ON, the voltage at terminals 12 and 14 is the same, and timing circuit 10 is not enabled.

The turning ON of the ignition switch S2 (whether S1 is ON or OFF) produces a positive change in the voltage at terminal 14. This, however, will not trigger timer circuit 26. In addition, diode D1 prevents any voltage drop from occurring across timer 26 and the remaining circuitry when ignition switch S2 is ON. Diode D1 also prevents the headlights 20 from being turned on as a result of the ignition switch S2 being turned ON.

Table 1 is a list of component values used in one successful embodiment of the system of FIG. 1.

TABLE 1

| R1 | 1K ohm |
|---|---|
| R2 | 10K ohm |
| R3 | 180K ohm |
| R4 | 470 ohm |
| C1 | 0.05 µf |
| C2 | 10 µf |
| Q1 | 2N2222 |

Figure 2:
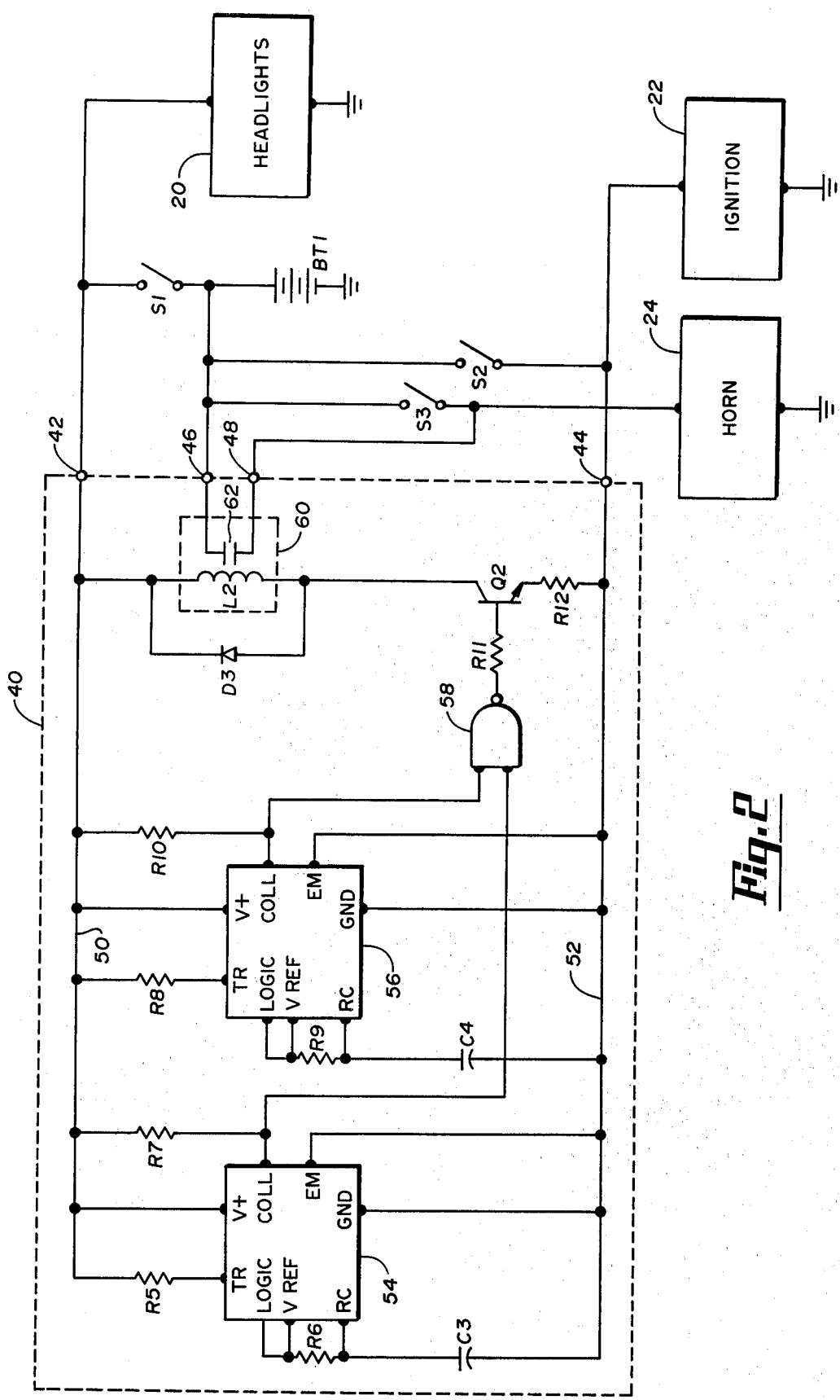
FIG. 2 is a schematic diagram of another preferred embodiment of the headlight warning apparatus of the present invention.

The Warning Apparatus of FIG. 2

FIG. 2 shows another preferred embodiment of the present invention. The headlight warning apparatus of FIG. 2 has the additional advantage of providing a time delay period immediately after the ignition switch has been opened during which the driver may turn off the headlights before the horn is sounded for a predetermined period. In other words, unlike the system of FIG. 1, the horn is not immediately energized as soon as the ignition switch is turned OFF while the headlight switch is turned ON. This eliminates the annoying sounding of the horn in those cases where the operator rapidly turns off first the ignition and then the headlights.

As in FIG. 1, the automobile includes a conventional storage battery BT1, which supplies power for headlights 20, ignition 22 and horn 24. Headlights 20, ignition 22 and horn 24 are controlled by headlight switch S1, ignition switch S2, and horn switch S3, respectively.

The headlight warning apparatus of FIG. 2 includes a circuit with a housing 40 and having terminals 42, 44, 46 and 48. Terminals 42 and 44 derive power for the circuit from headlight switch S1 and ignition switch S2, respectively.

The circuit has two main conductors 50 and 52 which are connected to terminals 42 and 44, respectively, and also includes two timing circuits. The first timing circuit includes solid state timer 54, resistors R5, R6 and R7, and capacitor C3. The second timing circuit includes solid state timer 56, resistors R8, R9, R10 and capacitor C4.

The trigger input of timer 54 is connected to conductor 50 through resistor R5. The Logic and the Reference terminals of timer 54 are connected to one terminal of resistor R6, and the other terminal of resistor R6 is connected to the RC terminal of timer 54. The capacitor C3 is connected between the RC terminal of timer 54 and conductor 52. The V+ terminal of timer 54 is connected to conductor 50, and the Emitter and Ground terminals in timer 54 are connected to conductor 52. The output of timer 54 is the Collector terminal. This terminal is connected through resistor R7 to conductor 50 and is also connected to one input of a NAND gate 58.

The second timing circuit is connected in a similar manner between conductors 50 and 52. The Trigger terminal is connected through resistor R8 to conductor 50. The Logic and the Reference terminals are connected to one terminal of resistor R9, and the other terminal of R9 is connected to the RC terminal of timer 56. Capacitor C4 is connected between the RC terminal and conductor 52. The V+ terminal is connected to conductor 50 and the Emitter and Ground terminals are connected to conductor 52. The output of timer 56 is the Collector terminal, which is connected through resistor R10 to conductor 50, and is connected directly to a second input of NAND gate 58.

The output of NAND gate 58 is supplied through resistor R11 to the base of NPN transistor Q2. The emitter of Q2 is connected through resistor R12 to conductor 52. The collector of Q2 is connected through coil L2 of relay 60 to conductor 50. Diode D3 is connected in parallel with coil L2. The normally open relay contacts 62 of relay 60 are connected to terminals 46 and 48, which in turn are connected to opposite sides of horn switch S3.

In operation, the system of FIG. 2 energizes horn 24 for a predetermined period if ignition switch S2 is turned to an OFF position and headlight switch S1 has remained ON beyond a first predetermined time period. Horn 24 is energized for a predetermined period of time and then is turned OFF. If, of course, headlight switch S1 is turned OFF during the predetermined period of time when horn 24 is energized, horn 24 is immediately turned off at that time.

If both headlight switch S1 and ignition switch S2 are OFF, or if ignition switch S2 is ON, but headlight switch S1 is OFF, the circuit is disabled and contacts 62 remain open. The circuit only can come into operation when both switches S1 and S2 are ON, and ignition switch S2 is then turned OFF. When this occurs, the voltage on conductor 52 drops to ground. As a result, a potential difference is created between terminals 42 and 44. Both timer 54 and timer 56 are triggered into operation by this event. The outputs of both timers 54 and 56 go high, which causes the output of NAND gate 58 to go low. This maintains transistor Q2 turned off. As a result, current does not flow through coil L2 despite the potential difference between terminals 42 and 44 caused by the opening of switch S2. Contacts 62 remain open because no current is flowing through coil L2.

The values of resistor R6 and C3 and of resistor R9 and capacitor C4 are selected to provide different timing intervals for the two timing circuits. In one preferred embodiment, the RC time constant $T_1$ provided by R6 and C3 is shorter than the RC time constant $T_2$ provided by R9 and C4. As a result, the output at the Collector terminal of timer 54 switches from high to low before the output at the Collector of timer 56 switches from high to low.

As previously noted, when switch S2 initially opens while switch S1 remains ON, both timer 54 and timer 56 have a high output. As a result, the output of NAND gate 58 is low, and transistor Q2 is turned off. The time constant $T_1$ determined by R6 and C3 causes the output of timer 54 to go low at time $T_1$, while the output of timer 56 is still high. At this time, the output of NAND gate 58 goes high, thereby turning on transistor Q1 and energizing L2. Contacts 62 close, thereby energizing horn 24.

When the output of timer 56 also goes low (which is at time $T_2$), both inputs to NAND gate 58 are then effectively tied to conductor 52. Since NAND gate 58 has no source of current or power except for its two inputs, no current is available to supply the base of transistor Q2. As a result, transistor Q2 turns OFF, thereby de-energizing coil L2 and opening contacts 62 of relay 60. Horn 24, therefore turns off.

The duration $T_E$ of the energization of horn 24 is the difference between the longer second time period $T_2$ during which the output of timer 56 is high and the shorter time period $T_1$ during which the collector output of timer 54 is high (i.e. $T_E = T_2 - T_1$). If, of course, switch S1 is opened during the period when horn 24 is energized, power is removed from terminal 42, and coil L2 is de-energized, thereby opening contacts 62. Horn 24, therefore, is turned off either at time $T_2$ or when switch S1 opens, whichever occurs first.

Table 2 is a list of component values used in one successful embodiment of the apparatus of FIG. 2.

TABLE 2

| | |
|---|---|
| R5 | 1K ohm |
| R6 | 220K ohm |
| R7 | 1K ohm |
| R8 | 1K ohm |
| R9 | 100K ohm |
| R10 | 1K ohm |
| R11 | 100 ohm |
| R12 | 80 ohm |
| C3 | 22 µf |
| C4 | 47 µf |
| Q2 | 2N2222 |
| Timer 54 | 3905 National Semiconductor |
| Timer 56 | 3905 National Semiconductor |

Conclusion

The present invention is a simple and low cost headlight warning apparatus which can be easily installed with a minimum number of connections to an existing automobile. The system requires no auxiliary buzzer since it makes use of the horn already contained in the automobile. All of the connections required may be made in the circuitry behind the dashboard of the automobile, and the circuit is small so that it can be concealed in the dashboard with little difficulty. When the lights are left on, the horn in energized only for a predetermined period, so that if the driver desires to leave the lights on, the horn will not remain energized indefinitely.

Although the present invention has been described with reference to preferred embodiments, workers skilled in the art will recognize that changes may be made in form and detail without departing from the spirit and scope of the invention.

What is claimed is:

1. A warning apparatus for use in a vehicle having an ignition switch, headlights, a headlight switch for controlling the headlights, a horn, and a horn switch for operating the horn, the system comprising:
   timer means operatively connected to the ignition switch, the headlight switch, and the horn for energizing the horn for a time period of predetermined duration after the ignition switch is turned off while the headlight switch remains on, and wherein turning off the headlight switch during the time period de-energizes the horn.

2. The warning apparatus of claim 1 wherein the timer means comprises:
   a solid state timer having a first output state and a second output state;
   triggering circuit means connected to the ignition switch, the headlight switch, and the solid state timer for triggering the solid state timer from the first output state to the second output state when the headlight switch is on and the ignition switch is turned off;
   time control circuit means connected to the solid state timer for controlling the predetermined duration of the time period during which the solid state timer is in the second output state; and
   horn control circuit means for energizing the horn when the solid state timer has its second output state.

3. The warning apparatus of claim 2 wherein the horn control circuit means comprises:
   a relay connected in parallel with the horn switch; and
   a relay driver connected to the solid state timer and the relay for driving the relay as a function of the output of the solid state timer.

4. The warning apparatus of claim 1 wherein the timer means includes time delay means for providing a time delay period after the ignition switch is turned off before the time period of predetermined duration commences and during which time delay period the headlight switch may be turned off to prevent the time period of predetermined duration from commencing.

5. The warning apparatus of claim 1 wherein the timer means comprises:
   a first timing circuit having an output for a time period $T_1$ after the ignition switch turns off and the headlight switch remains on;
   second timing circuit having an output for a time period $T_2$ after the ignition switch turns off and the headlight switch remains on, $T_2$ being longer than $T_1$; and
   horn control circuit means for energizing the horn after $T_1$ has expired and until $T_2$ expires, unless the headlight switch is turned off.

6. The warning apparatus of claim 1 wherein the timer means is an electrical timer connected across two conductors and in which the ignition switch and headlight switch are connected in series across said two conductors so that no voltage is applied to the timer means when both the ignition and headlight switches are closed.

* * * * *